J. NATHAN.
SAFETY VALVE.
APPLICATION FILED AUG. 17, 1915.
1,167,919.
Patented Jan. 11, 1916.
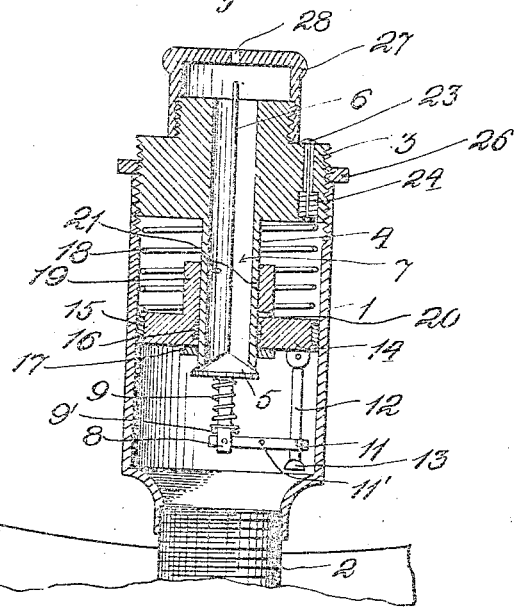
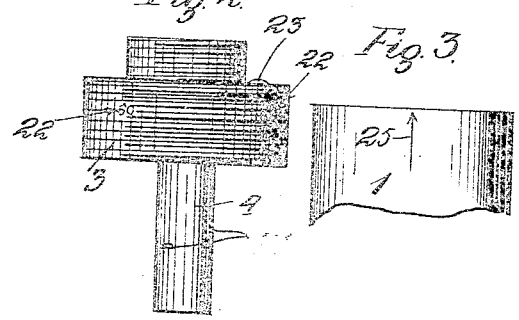
Witnesses:
Inventor:
John Nathan,

UNITED STATES PATENT OFFICE.

JOHN NATHAN, OF LOS ANGELES, CALIFORNIA, ASSIGNOR OF ONE-THIRD TO M. M. GILCHRIST AND ONE-THIRD TO J. C. SPAULDING, OF LOS ANGELES, CALIFORNIA.

SAFETY-VALVE.

1,167,919.

Specification of Letters Patent. Patented Jan. 11, 1916.

Application filed August 17, 1915. Serial No. 45,981.

*To all whom it may concern:*

Be it known that I, JOHN NATHAN, a subject of Great Britain, residing at Los Angeles, county of Los Angeles, and State of California, have invented a certain new and useful Improvement in Safety-Valves, of which the following is a specification.

My invention relates to a valve and has especial reference to a safety valve for pneumatic tires, one of the objects of this invention being to provide a simple, cheap and effective valve that may replace the ordinary tire valve and be quickly attached, and which will automatically relieve any excess of pressure due to expansion.

Another object of my invention is to provide a safety valve whereby a predetermined number of pounds of air may be delivered to the tire, and any amount in excess of that predetermined will escape, so that any air supplied and flowing through the valve after such predetermined pressure has been reached will not enter the tire but escape to the atmosphere.

Another object of my invention is to provide a simple safety valve that will obviate the necessity for the continuous use of a gage in ascertaining the pressure of air during the pumping up of a tire.

These and other objects are accomplished by the device described in the subjoined specification, in connection with the accompanying drawing, in which, Figure 1 is an enlarged sectional view of the valve embodying my invention. Fig. 2 is a detail of the plug, and Fig. 3, shows a fragment of the housing with the indicating arrow thereon.

My invention comprises a housing 1, preferably adapted for threaded engagement with a tube 2, of an ordinary tire valve, but capable of being integrally united with a tire.

Threading in the upper part of the housing 1, is a plug 3, having an inwardly directed tube 4, formed in the end thereof with a valve seat for engagement by a valve 5, having an upper stem 6, extending through and beyond the bore 7 in said tube and plug, and a lower stem 8, about which is coiled a spring 9, resting on a suitable support 9' and serving to hold the valve 5, in engagement with its seat. To the end of said lower stem 8, is pivotally connected one end of a bar or lever 11, on a fulcrum 11', within the housing, the other end of said lever being provided with a slot for the accommodation of a link 12, that extends through the slot and carries a knob or other device 13, for the purpose of engaging and moving said lever, as hereinafter appearing.

The link 12, is pivotally attached to a piston 14, mounted on the tube 4, and provided with packings 15 and 16, to prevent air leakage, a nut 17, holding the piston on said tube. Between said plug 3, and said piston 14, is a spring 18, of a predetermined resisting tension and compressible to bring about a relief of excess pressure in the tire in the following manner:

Assuming that in the position shown, the normal calculated pressure of air is in the tire. When for any reason, the pressure rises, the piston 14, will be forced upwardly against the tension of the spring 18, and relatively to the tube 4, in so doing causing the knob 13, of the link 12, to pull and operate the lever 11, which, drawing down on the valve stem 8, unseats the valve 5, and permits the excess air to escape through the tube 4. While the pressure of air in the tire is becoming equal to the normal tension of the spring 18, the piston recedes to normal position, in so doing removing the knob 13, from engagement with the lever 11, and causing the spring 9, to seat the valve 5. The distance of the knob 13, from the lever 11, governs the amount of excess pressure permitted before the valve 5, is unseated, and also governs the varying pressures that the different tires hold. Hence the distance of the knob from the lever is proportional to the pressure, or less in low pressures and progressively greater as the pressure increases. For this purpose the plug, spring, piston and valve collectively are movable, such movement in either direction tilting the lever in the one or the other direction and thereby governing the distance thereof with respect to the knob. In this manner the necessity for regulating the tension of the spring 18 is obviated.

In order to prevent supplying an excess amount of air to a tire, and avoid the constant use of a pressure gage during the pumping up of a tire, the following provision is made: The piston 14, is provided with a sleeve 19, having a port 20. The tube 4, is provided with a series of staggered ports 21, distributed in the tube in accordance with graduations 22, on the plug 3, which is provided with a valve 23, held in place by a feeble spring 24. It may be stated here that the piston 14, is movable longitudinally on the tube 4, but held against rotatory movement therewith by the link 12, and the stationary pivot or fulcrum 11'. In operation, the indicating mark on the plug representing the amount of pressure calculated for a tire is brought, by turning the plug, to the arrow 25, on the housing 1, such movement of the plug, bringing that particular one of the ports 21, which corresponds to the indicating mark, in line, but out of register, with the port 20, in the sleeve 19, of the piston. During the turning operation of the plug to cause the arrow to point directly to the indicating mark desired, the plug also descends together with the spring, piston, valve 5, and link 12. By such downward movement of the valve 5, the lever 11, connected therewith at one end, is moved about its fulcrum, causing the free end thereof to be tilted upwardly and farther away from the knob 13 of the link 12. When air is supplied, the valve 5, is and remains unseated. When the piston moves upwardly on the tube against the tension of the spring and under the pressure of the air, the port 20, will come in register with that port 21, with which it is in line, whereupon the air will escape through the now registering ports 20 and 21, into the space between the piston and plug and to the atmosphere through the valve 23. Such escape will continue as long as the air is supplied in such quantities as to hold the ports in register, and no amount of pressure of air in excess of that predetermined can enter the tire. When the air supply ceases, the valve 5, will immediately seat, and seal the air in the tire, which now contains just that amount previously determined upon. Since no excess of air can be supplied and the exact supply can be previously determined, the use of a gage is entirely unnecessary. When a higher pressure is desired, the plug is manipulated as before to bring the next port in the tube in line with the port 20, in the sleeve. The greater the distance between the ports, the greater will be the pressure supplied to the tire. After the manipulation of the plug for the purpose mentioned, it may be locked in position by a lock nut 26.

The top of the plug is preferably reduced and externally threaded for a cap 27, provided with a vent 28, for the passage of the excess air in the tire.

What I claim, is:—

1. A valve comprising a housing, a member threading therein and having an inwardly directed tube, a piston slidable on said tube, a compressible means normally holding said piston spaced from said member, a valve bearing against the end of said tube and pivotally connected to a lever fulcrumed in said housing, and means operatively connected with said piston to operate said valve when moving under the pressure of air in said housing.

2. A valve comprising a housing, a member threading therein and having an inwardly directed tube, a piston movable on and with said tube, a compressible means to hold said piston in normal position and to move same with said member, a valve bearing against the end of said tube, a lever fulcrumed in said housing and pivotally connected with said valve, and means operatively connected with and controllable by the movement of said piston in one direction to operate said valve.

3. A valve comprising a housing, a member movable longitudinally therein and having an inwardly directed tube, a piston movable on and relatively to said tube and yieldingly held spaced from said member, a valve to seal the end of said tube, a lever fulcrumed in said housing and pivotally connected with said valve, and means connected with said piston and having operative connection with said lever to unseat said valve when said piston moves in one direction, said member movable with said piston to govern the time of operation of said valve.

4. A valve comprising a housing, a plug threading therein and having a centrally disposed inwardly directed tube, a piston longitudinally movable on said tube, means to hold said piston on said tube when said plug is moved in one direction, a yielding means between said piston and plug to cause said piston to be moved with said plug in another direction, a spring-pressed valve bearing against the end of said tube and having a stem, a lever fulcrumed in said housing and pivotally connected at one end with said stem, and a link carried by said piston and provided with a knob extending in operative relation to the other end of said lever and operable by the movement of said piston in one direction to unseat said valve, said lever movable with said piston and with respect to the lever to govern the time of operation of the valve.

5. A valve comprising a housing, a member movable therein and having an inwardly directed tube provided with ports, a piston movable longitudinally on said tube and having a sleeve provided with a port, said member being rotatable to cause one of the ports in said tube to be brought in line with the port in said sleeve, and said piston being movable under pressure until the port in the sleeve thereon registers with the port in said tube, a valve seating against the end of said tube and pivotally connected to a lever fulcrumed in said housing, and means movable with said piston to operate said lever.

6. A valve mechanism comprising a casing, a member threading therein having a passage, a piston associated and movable longitudinally with said member in one direction and relatively to said member under pressure, a valve to seal the opening in said passage, means on said piston having operative connection with said valve and movable with said piston in the one direction to predetermine the time of operation of said valve, and in another direction to operate said valve.

7. A valve mechanism comprising a casing arranged for communication with a fluid container, a member movable therein longitudinally provided with a passage way and a plurality of ports, and having an outlet, a piston movable relatively to said member and forming with said member a chamber, and having a port, said member being rotatable to bring one of the ports therein in line with the port in said piston to predetermine the amount of fluid to be supplied, whereby when the port in said piston registers with one of the ports in said member the fluid will escape therethrough into said chamber and through the outlet in said member, and a valve to seal the passage in said member.

8. A valve mechanism comprising a casing, a member movable longitudinally therein and provided with a passage way, a piston on and movable with said member longitudinally, a yielding means between said piston and member, a valve to seal the passage in said member, a lever fulcrumed in said casing and connected at one end to said valve, and means in operative relation to said lever and controllable by the movement of said piston in one direction to predetermine the time of actuation of said valve, and in another direction to actuate said valve.

9. A valve mechanism comprising a casing, a member longitudinally movable therein and having a passage, a piston movable with said member in one direction and relatively to said member in another direction under pressure, a spring between said member and piston, a valve to seal said passage, and means in operative relation to said valve and controllable by the distance of travel of said piston for operating said valve at a predetermined pressure.

10. A valve mechanism comprising a casing, a manually movable member therein having a passageway, a valve to seal said passageway, a piston having means for operating said valve and movable with said member to predetermine the time of operation of said valve, said piston movable under pressure to operate said valve.

11. A valve comprising a housing, a member therein having a passage way and an outlet, a valve normally closing said passage way, a lever fulcrumed in said housing and connected at one end to said valve, a spring held piston on said member having a port, said member having a plurality of staggered ports and being axially movable to aline one of the ports therein with the port in said piston, means on said piston and in operative relation to said lever to engage and actuate said valve when said piston is moved by expansion of air, said piston serving to relieve excess air pressure supplied when the port therein registers with one of the ports in said member.

In testimony whereof I affix my signature in the presence of two witnesses.

JOHN NATHAN.

Witnesses:
FRANK NEWWHAM,
ANTON GLOETZNER, Jr.